US012620627B2

(12) United States Patent (10) Patent No.: US 12,620,627 B2
Qiu et al. (45) Date of Patent: May 5, 2026

(54) BATTERY

(71) Applicant: **ZHUHAI COSMX BATTERY CO.,
LTD.**, Zhuhai (CN)

(72) Inventors: Yaming Qiu, Zhuhai (CN); Hai Wang,
Zhuhai (CN); Suli Li, Zhuhai (CN)

(73) Assignee: **ZHUHAI COSMX BATTERY CO.,
LTD.**, Zhuhai (CN)

(*) Notice: Subject to any disclaimer, the term of this
patent is extended or adjusted under 35
U.S.C. 154(b) by 0 days.

(21) Appl. No.: 19/218,884

(22) Filed: May 27, 2025

(65) Prior Publication Data

US 2025/0372712 A1 Dec. 4, 2025

(30) Foreign Application Priority Data

Jun. 4, 2024 (CN) .......................... 202410716976.2

(51) Int. Cl.
H01M 10/0567 (2010.01)
H01M 4/38 (2006.01)
H01M 4/525 (2010.01)
H01M 4/587 (2010.01)
H01M 10/0525 (2010.01)
H01M 4/02 (2006.01)

(52) U.S. Cl.
CPC ....... H01M 10/0567 (2013.01); H01M 4/386
(2013.01); H01M 4/525 (2013.01); **H01M
4/587** (2013.01); *H01M 2004/021* (2013.01);
*H01M 10/0525* (2013.01); *H01M 2300/0025*
(2013.01)

(58) Field of Classification Search
None
See application file for complete search history.

(56) References Cited

U.S. PATENT DOCUMENTS

| | | | | |
|---|---|---|---|---|
| 9,603,245 | B2 * | 3/2017 | Suzuki ................ | H01M 4/1395 |
| 2010/0104951 | A1 | 4/2010 | Iwama et al. | |
| 2023/0131127 | A1 * | 4/2023 | Mu ................... | H01M 10/0568 |
| | | | | 429/341 |
| 2025/0112281 | A1 * | 4/2025 | Cui ................... | H01M 10/0569 |

FOREIGN PATENT DOCUMENTS

EP 3972018 B1 3/2022

OTHER PUBLICATIONS

K. J. Nelson, J. Xia, J. R. Dahn. Studies of the Effect of Varying
Prop-1-ene-1,3-sultone Content in Lithium Ion Pouch Cells, Journal
of the Electrochemical Society, 161 (12) A1884-A1889 (2014).*
M. S. Milien, H. Beyer, W. Beichel, P. Klose, H. A. Gasteiger, B. L.
Lucht, I. Krossing. Lithium Bis(2,2,2-trifluoroethyl)phosphate
Li[O2P(OCH2CF3)2]: A High Voltage Additive for LNMO/
Graphite Cells, Journal of The Electrochemical Society, 165 (11)
A2569-A2576 (2018).*
L. Wang, Y. Ma, Q. Li, Y. Cui, P. Wang, X. Cheng, P. Zuo, C. Du,
Y. Gao, G. Yin. Improved high-voltage performance of LiNi1/3Co1/
3Mn1/3O2 cathode with Tris(2,2,2-trifluoroethyl) phosphite as elec-
trolyte additive, Electrochimica Acta 243 (2017) 72-81.*
European Search Report issued in counterpart European Patent
Application No. EP 25178990.5, dated Dec. 19, 2025.

* cited by examiner

*Primary Examiner* — Carlos Barcena

(74) *Attorney, Agent, or Firm* — Westbridge IP LLC

(57) ABSTRACT

A battery includes a positive electrode plate, a negative
electrode plate, and an electrolyte solution. The negative
electrode plate includes a negative electrode current collec-
tor including a copper foil and a negative electrode active
material layer including a negative electrode active material
which including a silicon-based active material, the electro-
lyte solution includes lithium bis(trifluoromethanesulfonyl)
imide; and the battery satisfies following relationship:
$B-10A-C/10+3 \geq 0$; A is a grain size of copper foil, in a unit
of $\mu m$; B is a mess percentage of lithium bis(trifluorometh-
anesulfonyl)imide in the electrolyte solution, in a unit of wt
%; C is a mass percentage of the silicon-based active
material in the negative electrode active material, in a unit
of wt %, and $C \leq 50$. The battery may significantly alleviate
silicon negative electrode expansion while enhance the
kinetic performance and cycling stability of the battery
under room-temperature.

19 Claims, No Drawings

BATTERY

CROSS-REFERENCE TO RELATED APPLICATIONS

The present disclosure claims priority to Chinese Patent Application No. 202410716976.2, filed on Jun. 4, 2024, which is hereby incorporated by reference in its entirety.

TECHNICAL FIELD

The present disclosure pertains to the field of battery technologies, and specifically, to a battery.

BACKGROUND

With continuous advancements in technology, the demand for high-performance batteries has grown increasingly. Traditional lithium-ion batteries fail to meet the rigorous requirements of modern devices due to their limited energy density and cycle life. Consequently, the development of next-generation high-performance lithium-ion batteries has become the current research priority.

Silicon-containing negative electrode lithium-ion batteries have emerged in this context. Silicon, as an abundantly available and cost-effective element, is considered as an ideal negative electrode material that can provide significantly higher energy density. However, the development of the silicon-containing negative electrode lithium-ion batteries faces multiple challenges. Chief among these challenges is the volumetric effect of silicon. That is during battery charge/discharge cycles, the volume of silicon will change significantly, and the interface film is easily damaged, thereby causing electrode fracture, accelerated electrolyte solution decomposition with cycling-induced degradation and rapid capacity deterioration and other problems. Furthermore, the electrolyte solution will also react with silicon negative electrode, which impair the kinetics of the battery, thereby resulting in inferior cycling performance of silicon negative electrode batteries.

SUMMARY

The objective of the present disclosure is to overcome the problem in the prior art and provide a battery that significantly improves issues associated with silicon negative electrode expansion, and exhibits enhanced room-temperature cycling performance.

To achieve the above objective, the present disclosure provides a battery, the battery includes a positive electrode plate, a negative electrode plate, and an electrolyte solution, where the negative electrode plate includes a negative electrode current collector and a negative electrode active material layer on a surface of the negative electrode current collector, the negative electrode current collector includes a copper foil, the negative electrode active material layer includes a negative electrode active material, the negative electrode active material includes a silicon-based active material, the electrolyte solution includes lithium bis(trifluoromethanesulfonyl)imide; and the battery satisfies the following relationship:

$$B - 10A - C/10 + 3 \geq 0;$$

where A is a grain size of the copper foil, in a unit of m;

B is a mass percentage of lithium bis(trifluoromethanesulfonyl)imide in the electrolyte solution, in a unit of wt %; and C is a mass percentage of the silicon-based active material in the negative electrode active material, in a unit of wt %, and $C \leq 50$.

The present disclosure provides the following advantageous effects by employing the above technical solutions.

Through the synergistic effects of copper foil optimization and electrolyte solution additive optimization disclosed herein, issues caused by silicon negative electrode expansion can be effectively mitigated, including prevention of interfacial film rupture, electrode cracking, accelerated electrolyte solution consumption-deterioration cycles, and rapid capacity decay. Concurrently, it enhances the electrochemical performances of silicon negative electrodes, reduces interfacial losses, improves battery cycle life, positively impacts overall performance of the silicon-containing negative electrode batteries, boosts kinetic performance, and enhances room-temperature cycling stability.

Moreover, the battery disclosed herein is capable of mitigating the lithium deposition phenomenon, thereby prolonging its lifespan.

An endpoint and any value of the ranges disclosed herein are not limited to the exact ranges or values, and these ranges or values shall be understood to include values close to these ranges or values. For a numerical range, one or more new numerical ranges may be obtained in combination with each other between endpoint values of respective ranges, between endpoint values of respective ranges and individual point values, and between individual point values, and these numerical range should be considered as specifically disclosed herein.

DETAILED DESCRIPTION OF THE EMBODIMENTS

Specific implementations of the present disclosure are described below in detail. It should be understood that the specific implementations described herein are merely used for the purposes of illustrating and explaining the present disclosure, rather than limiting the present disclosure.

Unless otherwise defined, all scientific and technical terms used in the present disclosure have the same meaning as those conventionally understood by a person skill in the art in the field of technology to which the present disclosure pertains.

During the study process, it is discovered that enhancing mechanical properties of copper foil can partially suppress the expansion of silicon negative electrode, while adding lithium bis(trifluoromethanesulfonyl)imide (LiTFSI) to the electrolyte solution improves film-forming properties and battery kinetic performance. However, it is often challenging to simultaneously balance suppression of silicon negative electrode expansion with the improvement of cycling performance of the battery, and with lithium deposition remaining unresolved in some cases. For instance, when controlling copper foil with small grain size to achieve good mechanical properties, it can partially suppress the expansion of silicon negative electrode. However, the interfacial kinetics between the electrolyte solution and the negative electrode and film-forming capabilities of the electrolyte solution are poor and lithium deposition is prone to occur. Although adding LiTFSI can improve the film-forming characteristics to some extent, the resulting interfacial film demonstrates weak suppression of silicon expansion and is prone to rupture, leading to poor battery cycling stability.

Even if the grain size of copper foil is controlled and LiTFSI is simultaneously added, lithium deposition may still happen and cycling performance sometimes may be poor. Through research into multiple parameters, it is discovered that controlling the grain size in copper foil, LiTFSI concentration in the electrolyte solution, and the silicon content in the negative electrode under a certain relationship could simultaneously suppress silicon negative electrode expansion and enhance cycling performance. Specific implementation schemes are proposed as follows.

The present disclosure provides a battery including a positive electrode plate, a negative electrode plate, and an electrolyte solution, where the negative electrode plate includes a negative electrode current collector and a negative electrode active material layer on a surface of the negative electrode current collector, the negative electrode current collector includes a copper foil, the negative electrode active material layer includes a negative electrode active material, the negative electrode active material includes a silicon-based active material, the electrolyte solution includes lithium bis(trifluoromethanesulfonyl)imide; and the battery satisfies the following relationship:

$$B - 10A - C/10 + 3 \geq 0;$$

where A is a grain size of the copper foil, in a unit of m;
B is a mass percentage of lithium bis(trifluoromethanesulfonyl)imide in the electrolyte solution, in a unit of wt %; and
C is a mass percentage of the silicon-based active material in the negative electrode active material, in a unit of wt %, and C≤50.

In some embodiments, 0≤B−10A−C/10+3≤13, for example is 0, 0.5, 1, 2, 3, 4, 5, 6, 7, 8, 9, 10, 11, 12, or 13.

It was found that while larger grain size in copper foil can mitigate or even suppress lithium deposition in batteries, it may lead to poorer cycling performance at room-temperature. In some embodiments, when A≤0.75, for example is 0.75, 0.7, 0.65, 0.6, 0.55, 0.5, 0.45, 0.4, 0.35, 0.3, or 0.25, the battery exhibits good room-temperature cycling performance when the grain size falls within this range. And smaller grain sizes in copper foil results in fewer grain boundaries, correspond to smaller cracks in the metallic materials. Moreover, smaller grains are less prone to sliding and deformation, which makes the mechanical properties of the copper foil material relatively better. This helps to suppress the expansion of silicon negative electrodes more easily, prevent damage to the interfacial film, prevent electrode fracturing, and mitigate accelerated electrolyte solution consumption during cycling, which collectively addresses issues such as rapid capacity degradation.

In some embodiments, 0.4≤A≤0.7.

In the present disclosure, the grain size is determined according to method stipulated in GB/T 6394-2017 "Method for Determining the Average Crystal Size of Metals", and the grain size may be an average grain size.

In some embodiments, 0.5 K B K 15, for example is 0.5, 1, 2, 3, 4, 5, 6, 7, 8, 9, 10, 11, 12, 13, 14, or 15. When the content of LiTFSI falls within this range, it significantly improves the battery's cycling performance while inhibiting lithium deposition. When the content of LiTFSI is either excessively high or low, it may not be conducive to the inhibition of lithium deposition. As the content of LiTFSI increases, the battery's kinetic performance improves. However, when it becomes overly high, the viscosity of the electrolyte solution deteriorates significantly, leading to a decline in the kinetic performance. This may be attributed to the following: the silicon negative electrode interface retains a higher concentration of lithium ions, when the electrolyte solution contains an appropriate content of LiTFSI, preventing room-temperature cycling lithium deposition caused by poor silicon negative electrode kinetics. Moreover, LiTFSI exhibits superior film-forming properties, generating a film with high inorganic content and sufficient toughness to suppress silicon negative electrode expansion.

In certain embodiments, 2≤B≤12.

The higher a content of a silicon-based active material is, the higher an energy density of a lithium ion battery will become. However, an excessively high content of the silicon-based active material could lead to a significant decline in battery performance. In some embodiments, 2≤C≤50, for example is 2, 5, 10, 15, 20, 25, 30, 35, 40, 45, or 50. Under such conditions, when the content of the silicon-based active material falls within this range, the cycling performance of the battery may be further improved as the content of the silicon-based active material decreases, and mitigating or even suppressing lithium deposition.

In some embodiments, 2≤C≤30.

During the study, it is found that, when the relationship B−10A−C/(10+3)≥0 is satisfied, and the values of A, B, and C are all within a preferred range, the battery exhibits good cycling performance and significant inhibition against lithium deposition. However, its high-temperature cycling performance remains insufficient. This may be due to significant decrease in the stability of positive electrode interface under high-temperature conditions, which necessitates better and more protection for the positive electrode interface. In light of the research findings, the addition of a fluorinated phosphate ester to the electrolyte solution facilitated the formation of an effective interface protection in the positive electrode, thereby enhancing the high-temperature cycling performance without compromising the room-temperature cycling performance of the battery. In addition, the material is found to have minimal impact on the impedance of the silicon negative electrode, with no significant adverse effect on room-temperature cycling. While high content of a lithium salt adversely affects the positive electrode stability under high temperatures, the material significantly improves the stability of the positive electrode interface, thereby enhancing the stability of the electrolyte solution in the positive electrode. In some embodiments, the electrolyte solution further includes a fluorinated phosphate ester, the type of the fluorinated phosphate ester is not particularly limited and includes, but is not limited to, at least one of tris(2,2,2-trifluoroethyl) phosphate or tris(2,2,2-trifluoroethyl) phosphite.

In some embodiments, in the electrolyte solution, a content percentage of the fluorinated phosphate ester ranges from 0.1 to 6 wt %, for example is 0.1 wt %, 0.5 wt %, 1 wt %, 1.5 wt %, 2 wt %, 2.5 wt %, 3 wt %, 3.5 wt %, 4 wt %, 4.5 wt %, 5 wt %, 5.5 wt %, or 6 wt %.

In some embodiments, the electrolyte solution further includes a second additive, the second additive includes, but is not limited to, at least one of nitrile compound, sulfur-containing compound, or fluorinated compound other than a fluorinated phosphate ester.

In some embodiments, the nitrile compound includes at least one of 1,3,6-hexanetricarbonitrile (HTCN), adiponitrile (AND), butanedinitrile, 1,4-dicyano-2-butene, ethylene glycol bis(propionitrile) ether (DENE), or tri(3-cyanopropyl) phosphate (PCN).

In some embodiments, the nitrile compound constitutes 2 to 8 wt % by weight of the total electrolyte solution mass, for example is 2 wt %, 3 wt %, 4 wt %, 5 wt %, 6 wt %, 7 wt %, or 8 wt %, which may coordinate with the positive electrode to enhance interface stability, thereby further improving the high-voltage performance of the battery.

In some embodiments, sulfur-containing includes at least one of 1,3-propane sultone (PS), 1,3-propene sultone (PST), 5-methyloxoxanthiancyclo2,2-dioxide, 2,4-butane sultone, or 1,4-butane sultone. In some embodiments, the sulfur-containing compound constitutes 0.5 to 5 wt % by weight of the total electrolyte solution mass, for example is 0.5 wt %, 1 wt %, 2 wt %, 4 wt %, or 5 wt %. The sulfur-containing additives may form a high-temperature stability interface film on the negative electrode, reducing gas evolution, and significantly enhancing the performance of storage and cycling in high-temperature.

In some embodiments, the fluorinated compound other than a fluorinated phosphate ester includes, but is not limited to, at least one of fluorinated carbonate, fluorinated carboxylate, or fluorinated ether, for example, include at least one of fluoroethylene carbonate (FEC), fluoroethyl methyl carbonate (FEMC), diethyl fluorocarbonate (FDEC), 1,1,2,2-tetrafluoroethyl-2,2,3,3-tetrafluoropropyl ether (TTE), ethyl 2,2,2-trifluoroacetate (FEA), ethyl 2,2-difluoroacetate, or 1,1,2,2-tetrafluoroethyl-2,2,2-trifluoroethyl ether (HFE). The fluorinated compound exhibits good oxidation resistance, and exerting a strong stabilizing effect on the positive electrode. Moreover, they may also form a film on the negative electrode to reduce a side reaction at the negative electrode interface. A film formed by the fluorinated compound possesses good toughness to mitigate SEI film cracking caused by silicon expansion. When combined with small copper crystal grains, the fluorinated compound further suppresses silicon expansion, thereby enhancing battery stability, cycling performance, and mitigating or even inhibiting lithium deposition.

In some embodiments, in the electrolyte solution, a content percentage of the second additive ranges from 2 to 40 wt %, for example is 2 wt %, 5 wt %, 10 wt %, 15 wt %, 20 wt %, 25 wt %, 30 wt %, 35 wt %, or 40 wt %.

In some embodiments, the electrolyte solution further includes an electrolyte salt.

In some embodiments, the electrolyte salt includes at least one of lithium salt, sodium salt, potassium salt, aluminum salt, zinc salt, or magnesium salt, preferably includes the lithium salt.

In some embodiments, the lithium salt includes at least one of lithium hexafluorophosphate ($LiPF_6$), lithium difluorophosphate ($LiPO_2F_2$), lithium difluorooxalate borate (LiDFOB), lithium difluorobisoxalate phosphate, lithium tetrafluoroborate, lithium bisoxalate borate, lithium hexafluoroantimonate, lithium hexafluorarsenate, lithium bis(pentafluoroethanesulfonyl)imide, or lithium tris(trifluoromethylsulfonyl)methyl.

In some embodiments, in the electrolyte solution, a content percentage of the electrolyte salt ranges from 7 to 30 wt %, for example is 7 wt %, 10 wt %, 15 wt %, 20 wt %, 25 wt %, or 30 wt %.

In some embodiments, the electrolyte solution further includes an organic solvent. The organic solvent includes carbonate and/or carboxylate, for example in some embodiments, the carbonate includes at least one of ethylene carbonate (EC), propylene carbonate (PC), dimethyl carbonate, diethyl carbonate (DEC), or ethyl methyl carbonate; in some embodiments, the carboxylate includes at least one of propyl acetate, n-butyl acetate, isobutyl acetate, n-amyl acetate, isoamyl acetate, propyl propionate (PP), ethyl propionate (EP), methyl butyrate, or n-butyl propionate.

In some embodiments, in the electrolyte solution, a content percentage of the organic solvent ranges from 30 to 80 wt %, for example is 30 wt %, 40 wt %, 50 wt %, 60 wt %, 70 wt %, or 80 wt %.

In some embodiments, a thickness of the copper foil ranges from 4 μm to 12 m, for example is 4 μm, 6 μm, 8 μm, 10 μm, or 12 μm.

In some embodiments, the silicon-based active material includes at least one of nano-silicon (Si), silicon alloys (for example, Si—Fe, Si—Al, Si—Ni and so on), silicon-oxygen materials (SiOx, where 0<x<2), or silicon-carbon materials (for example is Si/C). These may be conventional silicon-based active materials in the art, which can be obtained commercially or prepared by conventional methods.

Excessively large silicon particles generate substantial stress due to expansion, which cannot be adequately tolerated by smaller copper crystal grains. Furthermore, during the expansion process, they tend to detach from copper foil or pierce through the copper foil, leading to corrosion of the copper foil and disruption of copper crystal structure, thus affecting the kinetic performance of the electrolyte solution. Conversely, excessively small silicon particles exhibit excessive specific surface area, poses an issue in that side reaction is too strong, while an additive in the electrolyte solution fails to form sufficient protective films, making it prone to film rupture during the expansion process. By satisfying the relationship described herein, it is possible to form high-performance protective films on silicon particles even with large or small particle sizes, avoiding film rupture and maintaining a better kinetic performance of the electrolyte solution, which in turn enables the battery to exhibit good cycling performance, and inhibiting the occurrence of lithium deposition. In some embodiments, a particle size Dv50 of the silicon-based active material ranges from 3 μm to 15 μm, for example is, 3 μm, 5 μm, 7 μm, 9 μm, 11 μm, 13 μm, or 15 μm. Within this range, a room-temperature cycling performance of the battery is further improved.

In some embodiments, the negative electrode active material further includes a carbon-based active material.

In some embodiments, the carbon-based active material includes at least one of graphite (for example is artificial graphite or natural graphite), hard carbon, or soft carbon.

In some embodiments, a particle size Dv50 of the carbon-based active material ranges from 4 m to 20 μm, for example is 4 μm, 6 μm, 8 μm, 10 μm, 12 μm, 14 μm, 16 μm, 18 μm, or 20 μm. When a particle size of the carbon-based active material falls within this range, it synergistically further enhances the cycling performance of the product in combination with the relationships of A, B, and C. Which may due to that this particle size range of the carbon-based active material is conducive to silicon infiltration, providing sufficient space for silicon expansion, thereby alleviating the damage caused by silicon expansion to the battery and avoiding damage to the copper foil. As a result, better negative electrode stability can be achieved, and kinetic performance can be enhanced.

In some embodiments, the negative electrode active material layer includes 80 to 99.8 wt % of a negative electrode active material, 0.1 to 10 wt % of a conductive agent, and 0.1 to 10 wt % of a binder.

In some embodiments, the negative electrode active material layer includes 90 to 99.6 wt % of the negative electrode active material, 0.2 to 5 wt % of the conductive agent, and 0.2 to 5 wt % of the binder.

In some embodiments, the positive electrode plate includes a positive electrode current collector and a positive electrode active material layer on a surface of the positive electrode current collector.

In some embodiments, the positive electrode active material layer includes a positive active material, a conductive agent, and a binder.

In some embodiments, the positive electrode active material layer includes 80 to 99.8 wt % of the positive active material, 0.1 to 10 wt % of the conductive agent, and 0.1 to 10 wt % of the binder.

In some embodiments, the positive electrode active material layer includes 90 to 99.6 wt % of the positive active material, 0.2 to 5 wt % of the conductive agent, and 0.2 to 5 wt % of the binder.

In some embodiments, the positive active material includes a lithium-containing transition metal oxide.

In some embodiments, the lithium-containing transition metal oxide is represented by the formula: $Li_{1+x}Ni_yCo_zM_mO_2$, where $-0.1 \leq x \leq 1$; $0 \leq y \leq 1$; $0 \leq z \leq 1$, and $0 \leq m \leq 1$; M include at least one of Mg, Zn, Ga, Ba, Al, Fe, Cr, Sn, V, Mn, Sc, Ti, Mo, Zr, Y, La, B, W, or Nb. By utilizing the lithium-containing transition metal oxide as the positive active material, interfacial side reactions are relatively reduced, enabling reversible charging and discharging with high kinetics. When combined with the fluorinated phosphate ester, the interfacial stability is further enhanced, improving the high-temperature cycling performance.

The types of the binder and the conductive agent in the positive electrode active material layer may be the same as or different from those in the negative electrode active material layer.

In some embodiments, the conductive agent is selected from at least one of conductive carbon black, acetylene black, Ketjen black, conductive graphite, conductive carbon fiber, carbon nanotube, or metal powder.

In some embodiments, the binder is selected from at least one of sodium carboxymethyl cellulose, styrene-butadiene rubber, polytetrafluoroethylene, or polyoxyethylene.

In some embodiments, the battery further includes a separator, which may be any separator known in the art, for example is a polyethylene separator, a polypropylene separator and so on.

In some embodiments, the battery is a lithium-ion secondary battery.

In some embodiments, the battery is a wound battery, that is the battery is formed by stacking a positive electrode plate, a separator, and a negative electrode plate in the order of the positive electrode plate, the separator, and the negative electrode plate, followed by winding. The wound battery includes a straight segment and a bent segment.

In some embodiments, the battery is a pouch battery, more preferably further including an aluminum laminated film disposed on the outer side of the battery. That is, the pouch battery includes an electrochemical cell and an aluminum laminate film encapsulated on the outer side of the electrochemical cell. The electrochemical cell includes a stacked arrangement of the positive electrode plate, the separator, and the negative electrode plate. The electrochemical cell may be a wound electrochemical cell prepared by conventional winding methods in the art. The electrochemical cell may be placed in an outer packaging aluminum foil (for example is aluminum laminate film), and an electrolyte solution is injected into the outer packaging aluminum foil, followed by processes such as vacuum packaging, standing, formation, shaping, and sorting, to obtain the lithium-ion secondary battery.

The present disclosure is further described in detail below with reference to specific examples. It should be understood that the following examples are merely for the purposes of illustrating and explaining the present disclosure, and should not be construed as limiting the protection scope of the present disclosure. All technologies achieved based on the foregoing content of the present disclosure are included in the protection scope of the present disclosure.

The materials, reagents, and the like used in the following examples are commercially available, unless otherwise specified.

The present disclosure is described in detail below with reference to specific examples, which are provided for illustrative purposes only and do not limit the scope of the present disclosure.

Example Group 1

This example group is intended to illustrate lithium-ion secondary batteries corresponding to different values of A, B, C and k.

1) Preparation of a Positive Electrode Plate

A positive electrode active material lithium cobalt oxide, polyvinylidene fluoride (PVDF), SP (super P), and carbon nanotubes (CNT) were mixed at a mass ratio of 96:2:1.5:0.5, N-methylpyrrolidone (NMP) was added, stirred using a vacuum mixer until a mixed system became a positive electrode active slurry with uniform fluidity; the positive electrode active slurry was evenly applied on two surfaces of an aluminum foil; and the coated aluminum foil was dried, followed by roll-pressing and cutting, to obtain the desired positive electrode plate.

2) Preparation of a Negative Electrode Plate

A negative electrode active material artificial graphite (Dv50 of 12 μm), a silicon-carbon material (Dv50 of 9 μm), sodium carboxymethyl cellulose (CMC-Na), styrene-butadiene rubber, conductive carbon black (SP), and single-walled carbon nanotubes (SWCNTs) were mixed at a mass ratio of (94.5-C):C:2.5:1.5:1:0.5, where the content of the silicon-carbon material is detailed in Table 1, deionized water was added, a negative electrode active slurry was obtained under action of a vacuum mixer; the negative electrode active slurry was evenly applied on two surfaces of a copper foil (a thickness of 6 μm); and the coated copper foil was dried at room temperature, and then transferred to an 80° C. oven for 10 hours, followed by cold pressing and cutting, to obtain the negative electrode plate. Where a grain size of the copper foil current collector is A, in a unit of m, with specific values as listed in Table 1.

3) Preparation of an Electrolyte Solution

In an argon-filled glove box ($H_2O < 0.1$ ppm, $O_2 < 0.1$ ppm), EC, PC, DEC, and PP were evenly mixed at a mass ratio of 15:15:20:50 to obtain a mixed solvent, then, fully dried lithium hexafluorophosphate ($LiPF_6$) that accounted for 14 wt % of a total mass of the electrolyte solution was quickly added into the mixed solvent, fully dissolved, LiTFSI that accounted for B wt % of a total mass of the electrolyte solution was add, where the specific values are as indicated in Table 1. Subsequently, HTCN, AND and FEC that respectively accounted for 2 wt %, 1 wt % and 12 wt % of the total mass of the electrolyte solution were added, the mixture was stirred evenly; and the desired electrolyte solution was obtained after passing water content and free acid tests.

The parameter k is defined as follows: k=(B−10A−C)/10+3, with specific values provided in Table 1.

4) Preparation of a Lithium-Ion Secondary Battery

The positive electrode plate prepared in Step 1), a separator and the negative electrode plate prepared in step 2), were stacked sequentially, followed by winding to obtain an electrochemical cell; the electrochemical cell was placed into outer packaging aluminum foil, and the electrolyte solution prepared in Step 3) was injected into the outer packaging, followed by processes such as vacuum packaging, standing, formation, shaping, and sorting, to obtain the battery.

The lithium-ion secondary battery was charged and discharged in a range of 3.0-4.5 V.

Comparative Example Group 1

The procedure of Example Group 1 was followed, except those values of A, B, C, and k differed from those in Example Group 1, as shown in Table 1.

Comparative Example Group 2

The procedure of Example 1-1 was followed, except that LiTFSI was replaced with an equivalent weight of alternative lithium salt, the types and amounts of which are shown in Table 1.

TABLE 1

| Number | A | B | C | k | type of lithium salt |
|---|---|---|---|---|---|
| Example 1-1 | 0.4 | 7 | 10 | 5 | B wt % of LiTFSI + 14 wt % of LiPF$_6$ |
| Example 1-2 | 0.5 | * | * | 4 | * |
| Example 1-3 | 0.6 | * | * | 3 | * |
| Example 1-4 | 0.7 | * | * | 2 | * |
| Example 1-5 | 0.8 | * | * | 1 | * |
| Example 1-6 | * | 2 | * | 0 | B wt % of LiTFSI + 14 wt % of LiPF$_6$ |
| Example 1-7 | * | 5 | * | 3 | * |
| Example 1-8 | * | 10 | * | 8 | * |
| Example 1-9 | * | 12 | * | 10 | * |
| Example 1-10 | * | 14 | * | 12 | B wt % of LiTFSI + 14 wt % of LiPF$_6$ |
| Example 1-11 | * | * | 2 | 5.8 | * |
| Example 1-12 | * | * | 6 | 5.4 | * |
| Example 1-13 | * | * | 25 | 3.5 | * |
| Example 1-14 | * | * | 45 | 1.5 | * |
| Comparative Example 1-1 | 0.7 | 3 | * | −2 | * |
| Comparative Example 1-2 | * | 1 | * | −1 | * |
| Comparative Example 1-3 | * | 0.2 | * | −1.8 | B wt % of LiTFSI + 14 wt % of LiPF$_6$ |
| Comparative Example 1-4 | * | * | 55 | 0.5 | * |
| Comparative Example 2-1 | * | 0 | * | −2 | 21 wt % of LiPF$_6$ |
| Comparative Example 2-2 | * | 0 | * | −2 | 7 wt % of LiFSI + 14 wt % of LiPF$_6$ |

Note:
in Table 1,
* indicates that it is the same as in Example 1-1.

Example Group 2

The procedure of Example Group 1-1 was followed, except that the electrolyte solution further includes a fluorinated phosphate ester, the type and composition of which are shown in Table 2.

In Examples 2-5, 2 wt % of tris(2,2,2-trifluoroethyl) phosphate was used to replace 2 wt of LiTFSI, that is in the electrolyte solution, a content of LiTFSI is 5 wt %, and a content of tris(2,2,2-trifluoroethyl) phosphate is 2 wt %.

TABLE 2

| Number | type and content of the fluorinated phosphate ester |
|---|---|
| Example 1-1 | — |
| Example 2-1 | 2 wt % of tris(2,2,2-trifluoroethyl) phosphate |
| Example 2-2 | 0.5 wt % of tris(2,2,2-trifluoroethyl) phosphate |
| Example 2-3 | 5 wt % of tris(2,2,2-trifluoroethyl) phosphate |
| Example 2-4 | 2 wt % of tris(2,2,2-trifluoroethyl) phosphite |
| Example 2-5 | 2 wt % of tris(2,2,2-trifluoroethyl) phosphate (partly substitute for LiTFSI) |

Note:
in Table 2, "—" indicates absence.

Example Group 3

The procedure of Example 1-1 was followed, except that the type and content of nitrile compound in the electrolyte solution differed as shown in Table 3.

TABLE 3

| Number | type and content of nitrile compound |
|---|---|
| Example 1-1 | 2 wt % of HTCN, and 1 wt % of ADN |
| Example 3-1 | 1 wt % of HTCN, and 1 wt % of ADN |
| Example 3-2 | 4 wt % of HTCN, and 4 wt % of ADN |
| Example 3-3 | 3 wt % of HTCN, and 2 wt % of ADN |
| Example 3-4 | 2 wt % of HTCN, and 3 wt % of ADN |

Example Group 4

The procedure of Example 1-1 was followed, except that the electrolyte solution further includes a sulfur-containing compound, the type and composition of which are shown in Table 4.

In Example 4-5, 3 wt % of 1,3-propene sultone was used to replace 3 wt % of LiTFSI, that is, in the electrolyte solution, the content of LiTFSI is 4 wt %, and the content of 1,3-propene sultone is 3 wt %.

TABLE 4

| Number | type and composition of the sulfur-containing compound |
|---|---|
| Example 1-1 | — |
| Example 4-1 | 3 wt % of 1,3-propene sultone |
| Example 4-2 | 0.5 wt % of 1,3-propene sultone |
| Example 4-3 | 5 wt % of 1,3-propene sultone |
| Example 4-4 | 3 wt % 2,4-butane sultone |
| Example 4-5 | 3 wt % of 1,3-propene sultone (partly substitute for LiTFSI) |

Note:
in Table 4, "—" indicates absence.

Example Group 5

The procedure of Example 1-1 was followed, except that the type and content of fluorinated compound other than a fluorinated phosphate ester in the electrolyte solution differed as shown in Table 5.

TABLE 5

| Number | type and content of fluorinated compound other than a fluorinated phosphate ester |
|---|---|
| Example 1-1 | 12 wt % of FEC |
| Example 5-1 | 5 wt % of FEC |

TABLE 5-continued

| Number | type and content of fluorinated compound other than a fluorinated phosphate ester |
|---|---|
| Example 5-2 | 18 wt % of FEC |
| Example 5-3 | 12 wt % of DFEC |

Example Group 6

The procedure of Example 1-1 was followed, except that particle sizes of artificial graphite and silicon-carbon material in the negative electrode active material differed as shown in Table 6.

TABLE 6

| Number | particle size Dv50 of artificial graphite/μm | particle size Dv50 of silicon-carbon material/μm |
|---|---|---|
| Example 1-1 | 12 | 9 |
| Example 6-1 | 4 | * |
| Example 6-2 | 20 | * |
| Example 6-3 | * | 3 |
| Example 6-4 | * | 15 |

Note:
in Table 6,
* indicates that it is equivalent to Example 1-1.

Example 7

The procedure of Example 1-1 was followed, except that silicon-oxygen material (Dv50 is 9 μm) was used in equal mass to replace the silicon-carbon material.

Test Example

Performance tests were conducted on the lithium-ion secondary batteries obtained from the Examples and Comparative Examples, with results shown in Table 7.

1) Cycling Performance Test at 25° C.

The batteries obtained in the Examples and Comparative Examples were charged and discharged for cycles within a charge-discharge cut-off voltage range at a rate of 1C at 25° C.; a discharge capacity of the first cycle was tested and recorded as x1 mAh; a discharge capacity of the $N^{th}$ cycle was tested and recorded as y1 mAh; the capacity of the $N^{th}$ cycle was divided by the capacity of the first cycle, to obtain a cycling capacity retention rate R of the $N^{th}$ cycle, where R=y1/x1. The cycle number at which R reached 80% was recorded.

2) Cycling Performance Test at 45° C.

The batteries obtained in the Examples and Comparative Examples were charged and discharged for cycles within a charge-discharge cut-off voltage range at a rate of 1C at 45° C.; a discharge capacity of the first cycle was tested and recorded as x2 mAh; a discharge capacity of the $N^{th}$ cycle was tested and recorded as y2 mAh; the capacity of the $N^{th}$ cycle was divided by the capacity of the first cycle, to obtain a cycling capacity retention rate R of the $N^{th}$ cycle, where R=y2/x2. The cycle number at which R reached 800 was recorded.

3) Lithium Deposition Test

At 25° C., batteries obtained in the Examples and Comparative Examples were disassembled after being fully charged, and the positive electrode plate, the negative electrode plate and the separator were separated; the condition of lithium deposition in the surface of the negative electrode plate was observed.

Results of the aforementioned test are shown in Table 7.

TABLE 7

| Number | number of cycles at 25° C./cycles | number of cycles at 45° C./cycles | condition of lithium deposition |
|---|---|---|---|
| Example 1-1 | 952 | 679 | No lithium deposition |
| Example 1-2 | 943 | 673 | No lithium deposition |
| Example 1-3 | 930 | 662 | No lithium deposition |
| Example 1-4 | 912 | 651 | No lithium deposition |
| Example 1-5 | 618 | 455 | No lithium deposition |
| Example 1-6 | 917 | 659 | No lithium deposition |
| Example 1-7 | 929 | 664 | No lithium deposition |
| Example 1-8 | 941 | 672 | No lithium deposition |
| Example 1-9 | 913 | 655 | No lithium deposition |
| Example 1-10 | 853 | 599 | No lithium deposition |
| Example 1-11 | 1072 | 803 | No lithium deposition |
| Example 1-12 | 1022 | 771 | No lithium deposition |
| Example 1-13 | 829 | 605 | No lithium deposition |
| Example 1-14 | 751 | 576 | No lithium deposition |
| Comparative Example 1-1 | 733 | 558 | Lithium deposition |
| Comparative Example 1-2 | 758 | 569 | Lithium deposition |
| Comparative Example 1-3 | 658 | 588 | Lithium deposition |
| Comparative Example 1-4 | 582 | 417 | Lithium deposition |
| Comparative Example 2-1 | 825 | 438 | No lithium deposition |
| Comparative Example 2-2 | 599 | 402 | Lithium deposition |
| Example 2-1 | 954 | 714 | No lithium deposition |
| Example 2-2 | 952 | 702 | No lithium deposition |
| Example 2-3 | 953 | 712 | No lithium deposition |
| Example 2-4 | 952 | 708 | No lithium deposition |
| Example 2-5 | 953 | 706 | No lithium deposition |
| Example 3-1 | 949 | 657 | No lithium deposition |
| Example 3-2 | 912 | 633 | No lithium deposition |
| Example 3-3 | 957 | 709 | No lithium deposition |
| Example 3-4 | 959 | 703 | No lithium deposition |
| Example 4-1 | 922 | 713 | No lithium deposition |
| Example 4-2 | 947 | 692 | No lithium deposition |
| Example 4-3 | 901 | 703 | No lithium deposition |

TABLE 7-continued

| Number | number of cycles at 25° C./cycles | number of cycles at 45° C./cycles | condition of lithium deposition |
|---|---|---|---|
| Example 4-4 | 925 | 705 | No lithium deposition |
| Example 4-5 | 933 | 701 | No lithium deposition |
| Example 5-1 | 862 | 663 | No lithium deposition |
| Example 5-2 | 955 | 667 | No lithium deposition |
| Example 5-3 | 841 | 674 | No lithium deposition |
| Example 6-1 | 869 | 602 | No lithium deposition |
| Example 6-2 | 931 | 687 | No lithium deposition |
| Example 6-3 | 947 | 671 | No lithium deposition |
| Example 6-4 | 941 | 681 | No lithium deposition |
| Example 7 | 887 | 642 | No lithium deposition |

Note:
in Table 7, "Non-lithium deposition" means that no significant lithium deposition is observed.

As shown in Table 7, batteries with Si content not exceeding 50 wt %, and satisfying the condition of B−10A−C/0+3≥0 exhibits good cycling performance and significantly inhibits or alleviates lithium deposition. Further comparing data in Example Group 1, it can be seen that when 0.4≤A≤0.7, the battery exhibits significantly better cycling performance; when 2≤B≤12, it is beneficial to improve the cycling performance of the battery while inhibit lithium deposition. Within the range of 2≤C≤50, cycling performance of the battery gradually improved as the content of the silicon-based active material decreased, albeit with a trade-off in energy density due to reduced Si content. It is necessary to control the content of Si within a reasonable range.

Example Groups 2 and 4 demonstrate that the use of the fluorinated phosphate ester or sulfur-containing compound significantly improves the 45° C. cycling performance while maintaining the 25° C. cycling performance. Furthermore, it can be seen from Tables 7 and 8 that partial replacement of LiTFSI with the fluorinated phosphate ester or sulfur-containing compound significantly improves the cycling performance at 45° C. compared to LiTFSI alone, while maintaining 25° C. cycling performance.

From the data derived from Example Groups 3 and 5, it can be observed that the addition of a suitable amount of nitrile compound and fluorinated compound other than a fluorinated phosphate ester is conducive to improving the cycling performance of the battery.

From the data derived from Example Group 6, it can be seen that selecting appropriate particle sizes of graphite and silicon-carbon materials may contribute to enhancing the cycling performance of the battery.

From the data derived from Example 7, it can be observed that using silicon-carbon materials as negative electrode active materials in a battery yields superior performance compared to silicon-oxide materials.

It is worth noting that in the present disclosure, the term "include", "comprise" or any variation thereof are intended to cover a non-exclusive inclusion, such that a process, method, article, or apparatus comprising listed elements may also include other elements not expressly listed or inherent to such process, method, article, or apparatus. In the absence of further constraints, an element defined by the phrase "comprise a . . . " does not exclude the presence of additional identical elements in the process, method, article, or apparatus. Moreover, it should be noted that the scope of the methods and devices in the present disclosure is not limited to executing functions in the order depicted or discussed, but may also include executing functions in a basic concurrent manner or in an opposite sequence, for example, executing the described method in a different sequence than described, and adding, omitting, or combining various steps. Furthermore, characteristics described in certain examples may be combined with other examples.

The foregoing embodiments are merely illustrative of the present disclosure and are not intended to limit its scope. Any modifications, equivalents, or improvements made within the spirit and principles of the present disclosure shall fall within the protection scope of the present disclosure.

What is claimed is:

1. A battery, comprising a positive electrode plate, a negative electrode plate, and an electrolyte solution, wherein the negative electrode plate comprises a negative electrode current collector and a negative electrode active material layer on a surface of the negative electrode current collector, the negative electrode current collector comprises a copper foil, the negative electrode active material layer comprises a negative electrode active material, the negative electrode active material comprises a silicon-based active material, the electrolyte solution comprises lithium bis(trifluoromethanesulfonyl)imide; and the battery satisfies the following relationship:

$$0 \le B-10A-C/10+3 \le 14;$$

wherein A is a grain size of the copper foil, in a unit of μm; 3≤B≤15, and B is a mass percentage of lithium bis(trifluoromethanesulfonyl)imide in the electrolyte solution, in a unit of wt %;
C is a mass percentage of the silicon-based active material in the negative electrode active material, in a unit of wt %, and C≤50;
the silicon-based active material is silicon-carbon material; and
the negative electrode active material further comprises a carbon-based active material, and the carbon-based active material comprises at least one of graphite, or soft carbon.

2. The battery according to claim 1, wherein A≤0.75; and/or 2≤C≤50; and/or 0≤B−10A−C/10+3≤13.

3. The battery according to claim 2, wherein the electrolyte solution further comprises fluorinated phosphate ester, and in the electrolyte solution, a content percentage of the fluorinated phosphate ester ranges from 0.1 to 6 wt %.

4. The battery according to claim 1, wherein the electrolyte solution further comprises a second additive, the second additive comprises at least one of nitrile compound, sulfur-containing compound, or fluorinated compound other than a fluorinated phosphate ester, and in the electrolyte solution, a content percentage of the second additive ranges from 2 to 40 wt %.

5. The battery according to claim 4, wherein the nitrile compound comprises at least one of 1,3,6-hexanetricarbonitrile, adiponitrile, butanedinitrile, 1,4-dicyano-2-butene, ethylene glycol bis(propionitrile) ether, or tri(3-cyanopropyl) phosphate; and/or the sulfur-containing compound comprises at least one of 1,3-propane sultone, 1,3-propene sultone, 5-methyloxoxanthiancyclo2,2-dioxide, 2,4-butane sultone, or 1,4-butane sultone; and/or the fluorinated compound other than a fluorinated phosphate ester comprises at least one of fluorinated carbonate, fluorinated carboxylate, or fluorinated ether.

6. The battery according to claim 1, wherein the fluorinated compound other than a fluorinated phosphate ester comprises at least one of fluoroethylene carbonate, fluoroethyl methyl carbonate, diethyl fluorocarbonate, 1,1,2,2-tetrafluoroethyl-2,2,3,3-tetrafluoropropyl ether, ethyl 2,2,2-trifluoroacetate, ethyl 2,2-difluoroacetate, or 1,1,2,2-tetrafluoroethyl-2,2,2-trifluoroethyl ether.

7. The battery according to claim 1, wherein the electrolyte solution further comprises an electrolyte salt, and the electrolyte salt comprises at least one of lithium salt, sodium salt, potassium salt, aluminum salt, zinc salt, or magnesium salt.

8. The battery according to claim 7, wherein the electrolyte salt is a lithium salt, and the lithium salt comprises at least one of lithium hexafluorophosphate, lithium difluorophosphate, lithium difluorooxalate borate, lithium difluorobisoxalate phosphate, lithium tetrafluoroborate, lithium bisoxalate borate, lithium hexafluoroantimonate, lithium hexafluorarsenate, lithium bis(pentafluoroethanesulfonyl) imide, or lithium tris(trifluoromethylsulfonyl)methyl.

9. The battery according to claim 1, wherein the electrolyte solution further comprises an organic solvent, and the organic solvent comprises carbonate and/or carboxylate; and in the electrolyte solution, a content percentage of the organic solvent ranges from 30 to 80 wt %.

10. The battery according to claim 9, wherein the carbonate comprises at least one of ethylene carbonate, propylene carbonate, dimethyl carbonate, diethyl carbonate, or ethyl methyl carbonate; and/or the carboxylate comprises at least one of propyl acetate, n-butyl acetate, isobutyl acetate, n-amyl acetate, iso-amyl acetate, propyl propionate, ethyl propionate, methyl butyrate, or n-butyl acetate.

11. The battery according to claim 1, wherein a particle size Dv50 of the silicon-based active material ranges from 3 μm to 15 μm.

12. The battery according to claim 1, wherein a particle size Dv50 of the carbon-based active material ranges from 4 μm to 20 μm.

13. The battery according to claim 1, wherein the positive electrode plate comprises a positive electrode current collector and a positive electrode active material layer on a surface of the positive electrode current collector, the positive electrode active material layer comprises a positive active material, a conductive agent, and a binder, and the positive active material comprises a lithium-containing transition metal oxide.

14. The battery according to claim 1, wherein the lithium-containing transition metal oxide is represented by the formula: $Li_{1+x}Ni_yCo_zM_mO_2$, wherein, $-0.1 \leq x \leq 1$; $0 \leq y \leq 1$, $0 \leq z \leq 1$, and $0 \leq m \leq 1$; M comprises at least one of Mg, Zn, Ga, Ba, Al, Fe, Cr, Sn, V, Mn, Sc, Ti, Mo, Zr, Y, La, B, W, or Nb.

15. The battery according to claim 1, wherein the battery is a lithium-ion secondary battery.

16. The battery according to claim 15, wherein the battery is a wound battery or a pouch battery.

17. The battery according to claim 1, wherein $2 \leq B-10A-C/10+3 \leq 13$.

18. The battery according to claim 1, wherein $0.4 \leq A \leq 0.75$, and/or $5 \leq C \leq 50$.

19. The battery according to claim 3, wherein the fluorinated phosphate ester comprises at least one of tris(2,2,2-trifluoroethyl) phosphate or tris(2,2,2-trifluoroethyl) phosphite.

* * * * *